(12) United States Patent
Ford

(10) Patent No.: US 9,586,450 B2
(45) Date of Patent: Mar. 7, 2017

(54) TRAILER HITCH ASSEMBLIES

(71) Applicant: Dixon Ford, Kaysville, UT (US)

(72) Inventor: Dixon Ford, Kaysville, UT (US)

(73) Assignee: Dixon Ford, Kaysville, UT (US)

(*) Notice: Subject to any disclaimer, the term of this patent is extended or adjusted under 35 U.S.C. 154(b) by 0 days.

(21) Appl. No.: 14/503,989

(22) Filed: Oct. 1, 2014

(65) Prior Publication Data

US 2016/0096406 A1  Apr. 7, 2016

(51) Int. Cl.
*B60D 1/24* (2006.01)
*B60D 1/48* (2006.01)
*B60D 1/52* (2006.01)
*B60D 1/30* (2006.01)

(52) U.S. Cl.
CPC .............. *B60D 1/241* (2013.01); *B60D 1/24* (2013.01); *B60D 1/30* (2013.01); *B60D 1/48* (2013.01); *B60D 1/52* (2013.01)

(58) Field of Classification Search
CPC ... B60D 1/04; B60D 1/06; B60D 1/52; B60D 1/155; B60D 1/241; B60D 1/50; B60D 1/58; B60D 1/24; B60D 1/30; B60D 1/36; B60D 1/48; B21D 51/26; B21D 51/2615; B21D 51/2638; B21D 51/2692; B21D 21/00; B60R 9/06; B60R 9/10; B23Q 39/028; B23Q 39/044; B23Q 3/061; B23Q 7/02; B60P 7/0807; F16K 3/0218; F16K 3/0236; F16L 13/002; F16L 27/12; E02F 9/2833; Y10S 16/06; Y10T 403/32868; E05Y 2201/222

USPC ......................................................... 280/506
See application file for complete search history.

(56) References Cited

U.S. PATENT DOCUMENTS

| | | | |
|---|---|---|---|
| 2,280,662 A | 4/1942 | Pawsat | |
| 3,198,562 A * | 8/1965 | Smith | F16L 13/002 285/403 |
| 5,197,349 A | 3/1993 | Herman | |
| 5,244,133 A * | 9/1993 | Abbott | B60R 9/10 224/521 |
| 5,251,494 A | 10/1993 | Edwards | |
| 5,333,888 A | 8/1994 | Ball | |
| 5,410,826 A * | 5/1995 | Immel | E02F 9/2833 37/455 |

(Continued)

OTHER PUBLICATIONS

Ford, Dixon, U.S. Appl. No. 14/794,405, filed Jul. 8, 2015, titled "Hitch Mount Assemblies Including Trailer Hitch Adapter Sleeves".

*Primary Examiner* — Joseph Rocca
*Assistant Examiner* — Daniel Yeagley
(74) *Attorney, Agent, or Firm* — TraskBritt

(57) ABSTRACT

A trailer hitch assembly sized and shaped to fit within a trailer hitch receptacle, wherein the trailer hitch assembly includes a first tubular element and a second tubular element. Each tubular element has an angled end, wherein the angled ends of the first tubular element and the second tubular element are complementary to each other. The trailer hitch assembly may further include at least one guide to assist in aligning the first tubular element with the second tubular element along the angled ends. The trailer hitch assembly may further include an actuator configured to engage both the first tubular element and the second tubular element and to diagonally displace the first tubular element relative to the second tubular element.

10 Claims, 9 Drawing Sheets

(56) References Cited

U.S. PATENT DOCUMENTS

| | | |
|---|---|---|
| 5,423,566 A | 6/1995 | Warrington et al. |
| 5,685,686 A | 11/1997 | Burns |
| 6,131,938 A | 10/2000 | Speer et al. |
| 6,260,931 B1 | 7/2001 | Stewart |
| 6,293,372 B1 * | 9/2001 | Lorenz ............... F16D 65/0006 188/171 |
| 6,382,656 B1 | 5/2002 | Johnson, Jr. |
| 6,834,879 B1 | 12/2004 | Lorman |
| 6,835,012 B1 | 12/2004 | Neri |
| 6,835,021 B1 | 12/2004 | McMillan |
| 7,004,491 B1 | 2/2006 | Allsop et al. |
| 7,195,269 B2 | 3/2007 | Tambornino |
| 7,338,065 B1 | 3/2008 | Clausen |
| 7,448,640 B2 | 11/2008 | Weaver |
| 7,594,673 B1 | 9/2009 | Devlin |
| 7,717,455 B2 | 5/2010 | Morris |
| 7,726,681 B2 | 6/2010 | McKendry |
| 8,079,612 B1 | 12/2011 | Tambornino |
| 8,262,121 B2 | 9/2012 | Beck |
| 9,027,950 B2 * | 5/2015 | Lahn ....................... B60D 1/06 280/506 |
| 2011/0210530 A1 | 9/2011 | Hancock et al. |

\* cited by examiner

TRAILER HITCH ASSEMBLIES

TECHNICAL FIELD

Embodiments of the present disclosure relate to trailer hitch assemblies for use in vehicle trailer hitch receptacles and related methods.

BACKGROUND

Known non-wobble two-piece trailer hitches are described in, for example, U.S. Pat. No. 6,835,021 to McMillan, filed May 28, 2003; U.S. Pat. No. 5,423,566 to Warrington et al., filed Aug. 26, 1993; and U.S. Pat. No. 5,685,686 to Burns, filed Mar. 22, 1996, the disclosure of each of which is incorporated herein by reference. Such trailer hitches employ opposed wedge-shaped surfaces that displace one element of the two-piece hitch assembly laterally or diagonally with respect to another element of the two-piece hitch assembly to cause two or more of the elements to press against two or more internal side walls of a hitch receptacle. The trailer hitches of the above-referenced patents are described as being useful for supporting bicycles.

BRIEF SUMMARY

In one embodiment, the present disclosure includes a trailer hitch assembly. The trailer hitch assembly may be sized and shaped to fit within a trailer hitch receptacle. The trailer hitch assembly may include: a first hitch member having a rectangular cross section and having a first end and a first angled end opposite the first end. The first angled end may have a planar end surface extending from a first edge of the first hitch member to a second diagonally opposite edge of the first hitch member. The first edge may define a line along a longitudinal length of the first hitch member. The planar end surface of the first angled end may extend along a plane. A reference line may be in the plane between the first edge and the second diagonally opposite edge, wherein the line defined by the first edge and the reference line in the plane define an acute angle therebetween. A second hitch member may have a second end and a second angled end opposite the second end. The second angled end of the second hitch member may be complementary to the first angled end of the first hitch member. At least one guide projection may be disposed partially within at least one of the first hitch member and the second hitch member and may longitudinally extend from one of the angled ends of the first hitch member or the second hitch member. The trailer hitch assembly may include an actuator configured to engage both the first hitch member and the second hitch member and configured to diagonally displace the first hitch member relative to the second hitch member upon actuation.

In another embodiment, the present disclosure includes a trailer hitch assembly including: two hitch members. Each hitch member of the two hitch members may have an angled end, wherein the angled ends of the two hitch members are configured to complementarily align one with another. The angled end of each of the two hitch members may include a planar end surface that extends from a first edge of a respective hitch member of the two hitch members to a second diagonally opposite edge of the respective hitch member of the two hitch members. The trailer hitch assembly may include an actuator configured to engage both of the two hitch members and to diagonally displace the two hitch members relative to one another. The trailer hitch assembly may further include a first hole in a side wall of one of the two hitch members and a second hole in a side wall of the other of the two hitch members. The first hole and the second hole may be configured to be aligned when the two hitch members are aligned along the angled ends of the two hitch members.

In yet another embodiment, the present disclosure includes a method of forming a trailer hitch assembly. The method of forming a trailer hitch assembly may include forming two hitch members having complementary angled ends and forming a hole in a side wall of each of the two hitch members. The two hitch members are configured to align together along the complementary angled ends. The method may include attaching at least one guide projection to an interior surface of at least one of the two hitch members and attaching a ball mount to one of the two hitch members. The method may include forming a first actuator hole through the ball mount and forming a second actuator hole through a nut mount. The second actuator hole may have an enlarged portion. The method may include securing the nut mount to the interior surface of one of the two hitch members and aligning the second actuator hole of the nut mount axially with the first actuator hole of the ball mount. The method may include positioning a nut within the enlarged portion of the second actuator hole of the nut mount, inserting an elongated bolt through the first actuator hole in the ball mount, and engaging the elongated bolt with the nut.

DETAILED DESCRIPTION

The illustrations presented herein are not meant to be actual views of any particular trailer hitch or component thereof, but are merely idealized representations that are used to describe embodiments of the disclosure.

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

As used herein, the term "longitudinal" means along a length of the trailer hitch assembly extending from a ball mount of the trailer hitch assembly to a distal end of the trailer hitch assembly opposite the ball mount, which is the distal end being configured for insertion into a trailer hitch receptacle of a vehicle.

Embodiments of the present disclosure include trailer hitch assemblies that include a first hitch member and a second hitch member with complementary angled ends and an actuator for diagonally displacing the first and second hitch members relative to each other. The diagonal displacement may force the first and second hitch members against an interior surface of a trailer hitch receptacle to secure the trailer hitch assembly within the trailer hitch receptacle.

Figure 1:
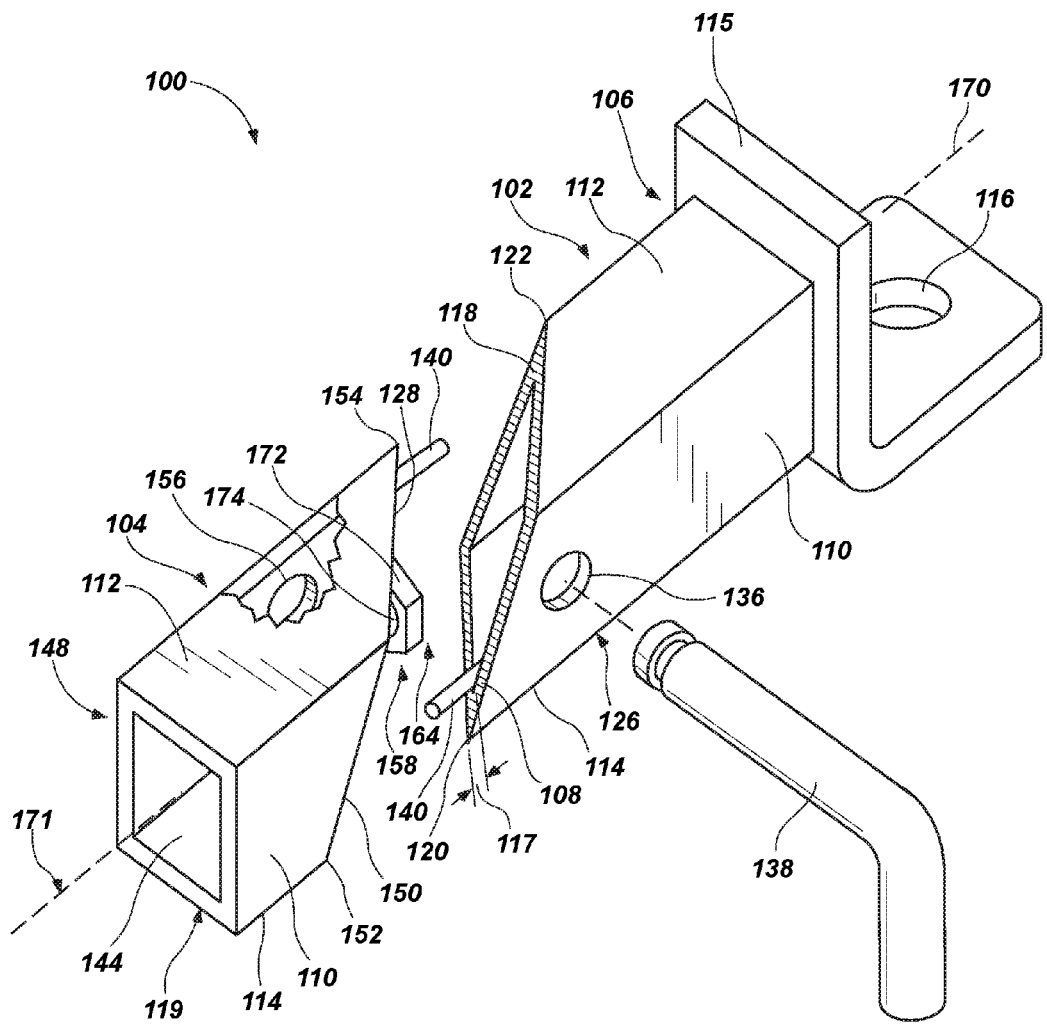
FIG. 1 is a perspective view of a trailer hitch assembly according to an embodiment of the present disclosure.
Figure 14:
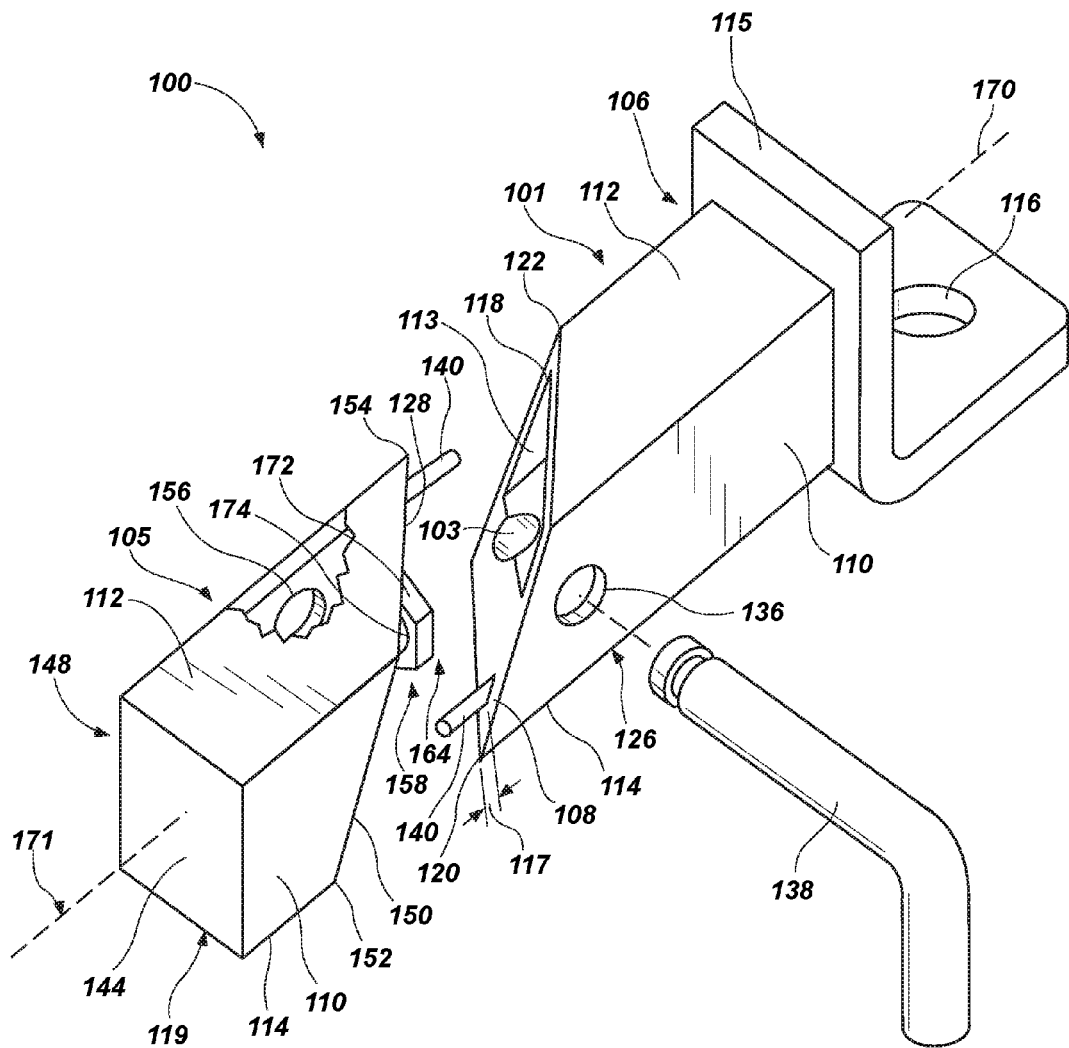
FIG. 14 is a perspective view of a trailer hitch assembly according to an embodiment of the present disclosure.

FIG. 1 is a perspective view of a trailer hitch assembly 100 according to an embodiment of the present disclosure. The trailer hitch assembly 100 may include a first hitch member and a second hitch member. In some embodiments, the first and second hitch members may be a first tubular element 102 and a second tubular element 104, respectively. In alternative embodiments, as shown in FIG. 14, the first and second hitch members may be a first solid element 101 and a second solid element 105. The first solid element 101 may have a bore hole 103 extending through the first solid element 101. In other embodiments, the first and second hitch members may include the first solid element 101 and the second tubular element 104 and vice versa. For convenience, the first and second hitch members will be referred to below as the first tubular element 102 and second tubular element 104. However, it is understood that the first and second hitch members may be tubular (e.g., hollow with relatively thin sidewalls, FIG. 1) or solid (e.g., solid with a bore hole 103 extending therethrough, FIG. 14). The first tubular element 102 may have a first end 106 and a first angled end 108 opposite the first end 106. Each tubular element of the first and second tubular elements 102, 104 may include two side walls 110, an upper wall 112, and a lower wall 114. The first end 106 of the first tubular element 102 may be attached to a ball mount 115. Ball mounts are known in the art and may include a ball mount hole 116 for attaching a trailer ball. Trailer balls are available in various sizes to accommodate complementary sizes of trailer hitch couplers of trailers. In some embodiments, the walls 110, 112, 114 of each of the first tubular element 102 and the second tubular element 104 may have a wall thickness 117 of at least about 3/16 inch. The respective wall thicknesses 117 of the first tubular element 102 and of the second tubular element 104 may be at least substantially the same or may be different. For example, in some embodiments, the walls 110, 112, 114 of the first tubular element 102 and the second tubular element 104 may have the same wall thicknesses 117 of about 3/16 inch. In other embodiments, the walls 110, 112, 114 of the first tubular element 102 may have a wall thickness 117 of about 1/4 inch and the walls 110, 112, 114 of the second tubular element 104 may have a wall thickness 117 of about 3/16 inch. In some embodiments, both the first tubular element 102 and second tubular element 104 may have equal respective external circumferences 119. In other embodiments, respective external circumferences 119 of the first tubular element 102 and second tubular element 104 may be different.

Each of the first tubular element 102 and second tubular element 104 may include a rectangular tube that includes four longitudinally extending edges defined between adjacent walls of the side walls 110, upper wall 112, and lower wall 114. The first tubular element 102 may include a first edge 120 and a second edge 122. The first edge 120 may be at an intersection of the lower wall 114 and one of the side walls 110 of the first tubular element 102. The second edge 122 may be at an intersection of the upper wall 112 and the other of the side walls 110 of the first tubular element 102 and may be diagonally opposite the first edge 120. The first tubular element 102 may include a first central axis 170, which may extend generally centrally in a longitudinal direction of the first tubular element 102. The first central axis 170 may be centered between the upper and lower walls 112, 114 of the first tubular element 102 and centered between side walls 110 of the first tubular element 102. The second tubular element 104 may include a second central axis 171, which may extend generally centrally in a longitudinal direction of the second tubular element 104. The second central axis 171 may be centered between the upper and lower walls 112, 114 of the second tubular element 104 and centered between side walls 110 of the second tubular element 104.

The first angled end 108 of the first tubular element 102 may include a first planar end surface 118 extending from the first edge 120 of the first tubular element 102 to the second edge 122 of the first tubular element 102 diagonally opposite the first edge 120. In other embodiments, the first planar end surface 118 may extend from one side wall 110 of the first tubular element 102 to the other side wall 110 of the first tubular element 102.

The first tubular element 102 may include a first hole 136 in one of the side walls 110. A center of the first hole 136 may be substantially centered between the upper wall 112 and lower wall 114 of the first tubular element 102. Furthermore, the first hole 136 may be located longitudinally between an end of the first edge 120 on the first angled end 108 and an end of the second edge 122 on the first angled end 108 of the first tubular element 102. In embodiments where the first planar end surface 118 extends from one side wall 110 of the first tubular element 102 to the other side wall 110 of the first tubular element 102, the first hole 136 may be located between the two side walls 110 on the first angled end 108 relative to the longitudinal length of the trailer hitch assembly 100. The trailer hitch assembly 100 may include a security pin 138 configured to be inserted through the first hole 136.

The second tubular element 104 of the trailer hitch assembly 100 may have a second end 148 opposite a second angled end 128. The second angled end 128 of the second tubular element 104 may be complementary in size and shape to the first angled end 108 of the first tubular element 102. As used herein, the term "complementary" means that one angled end is a complement of another angled end. In other words, the angled ends 108, 128 are so configured that when the two tubular elements 102, 104 are placed together along the angled ends 108, 128, the two tubular elements form two mutually completing parts of the trailer hitch assembly 100. Stated another way, the term "complementary" means that when two complementary pieces are placed together, the two complementary pieces form a whole. In the current disclosure, the first and second tubular elements 102, 104 form complementary pieces of the trailer hitch assembly 100. On the other hand, as used herein, the term "complementary" in reference to angles does not refer to the addition of the angles resulting in a right angle. The second tubular element 104 may include a third edge 152 and a fourth edge 154. The third edge 152 may be at an intersection of the lower wall 114 and one of the side walls 110 of the second tubular element 104. The fourth edge 154 may be at an intersection of the upper wall 112 and the other of the side walls 110 of the second tubular element 104 and may be diagonally opposite the third edge 152. In some embodiments, the second angled end 128 may include a second planar end surface 150 extending from the third edge 152 of the second tubular element 104 to the fourth edge 154 of the second tubular element 104 diagonally opposite the third edge 152. The second planar end surface 150 of the second tubular element 104 may be complementary to the first planar end surface 118 of the first tubular element 102, such that the first and second planar end surfaces 118, 150 are parallel to each other when the first and second tubular elements 102, 104 are aligned.

As used herein, the term "aligned," when used in relation to a first tubular element 102 and a second tubular element 104, means having the first tubular element 102 placed next to the second tubular element 104 and having the first angled end 108 of the first tubular element 102 in direct contact with a second angled end 128 of the second tubular element 104. When the two tubular elements 102, 104 are aligned, the first central axis 170 of the first tubular element 102 and the second central axis 171 of the second tubular element 102 are collinear. Furthermore, when the first tubular element 102 and second tubular element 104 have walls of substantially the same wall thickness and are aligned, the first angled end 108 may be in contact with substantially all of the second angled end 128 and vice versa. The term "aligned" further means that an upper wall 112 of the first tubular element 102 is at least substantially flush with an upper wall 112 of the second tubular element 104 and that a lower wall 114 of the first tubular element 102 is at least substantially flush with a lower wall 114 of the second tubular element 104.

The trailer hitch assembly 100 may include at least one guide projection 140 attached to an interior surface 144 of at least one of the two tubular elements 102, 104. The at least one guide projection 140 may protrude at least partially from the angled end 108, 128 of the tubular element 102, 104 to which the at least one guide projection 140 is attached. For example, the first tubular element 102 may include at least one guide projection 140 protruding at least partially from the first angled end 108 of the first tubular element 102 and configured to enter at least partially into the second tubular element 104. In some embodiments, the at least one guide projection 140 may be a thin rod with a portion of the rod thinner than the remainder of the rod. The thinner portion of the rod may protrude from the first angled end 108 of first tubular element 102. In other embodiments, the at least one guide projection 140 may be a thin flat bar protruding from first angled end 108 of first tubular element 102. In other embodiments, the at least one guide projection 140 may include, for example, a tab, pin, bolt, and/or flange. The at least one guide projection 140 may be configured to assist in aligning the first tubular element 102 with the second tubular element 104. In embodiments including either a first solid element 101 and/or a second solid element 105, the first and second solid elements 101, 105 may include at least one cavity 113, as shown in FIG. 14. The at least one cavity 113 may permit an extending portion of at least one guide projection secured to an opposite tubular element to enter therein and move therein when the two tubular elements 101, 105 are aligned. Further details regarding the at least one guide projection 140 are provided below with reference to FIG. 5.

In some embodiments, when the first tubular element 102 and the second tubular element 104 are aligned, the first edge 120 of the first tubular element 102 may align with the third edge 152 of the second tubular element 104, and the second edge 122 of the first tubular element 102 may align with the fourth edge 154 of the second tubular element 104. In embodiments where the wall thicknesses 117 of both tubular elements 102, 104 are substantially the same, when the first tubular element 102 is aligned with the second tubular element 104 and prior to diagonal displacement and misalignment, the second angled end 128 and second planar end surface 150 may be sized and shaped such that the second planar end surface 150 may be in contact with substantially all of the first planar end surface 118, and vice versa. In embodiments where the wall thicknesses 117 of the two tubular elements 102, 104 differ, when the first tubular element 102 is aligned with the second tubular element 104 and prior to diagonal displacement and misalignment, the planar end surface 118, 150 of the angled end 108, 128 of the tubular element 102, 104 with the thicker walls may be in contact with substantially all of the planar end surface 118, 150 of the angled end 108, 128 of the tubular element 102, 104 with the thinner walls. Furthermore, when the first tubular element 102 is aligned with the second tubular element 104 and prior to diagonal displacement and misalignment, the first central axis 170 of the first tubular element 102 and the second central axis 171 of the second tubular element 104 may be collinear.

The second tubular element 104 may include an actuator 158 including a nut mount 164 disposed within the second tubular element 104. The nut mount 164 may include a secured portion 172 and a nut 178. The secured portion 172 may be secured to an interior of the fourth edge 154 of the second tubular element 104. The actuator 158 may further include an elongated bolt 160 (FIG. 3) extending through the first tubular element 102 for bringing the two tubular elements 102, 104 closer together. In embodiments, as shown in FIG. 14, including either a first solid element 101 or a second solid element 105, the at least one cavity 113 may include a cavity 113 in the first solid element 101 sized and shaped to receive the nut mount 164 therein when the two elements 101 or 102 and 105 or 104 are aligned. Further details regarding the actuator 158 are provided below with reference to FIG. 3.

Figure 2:
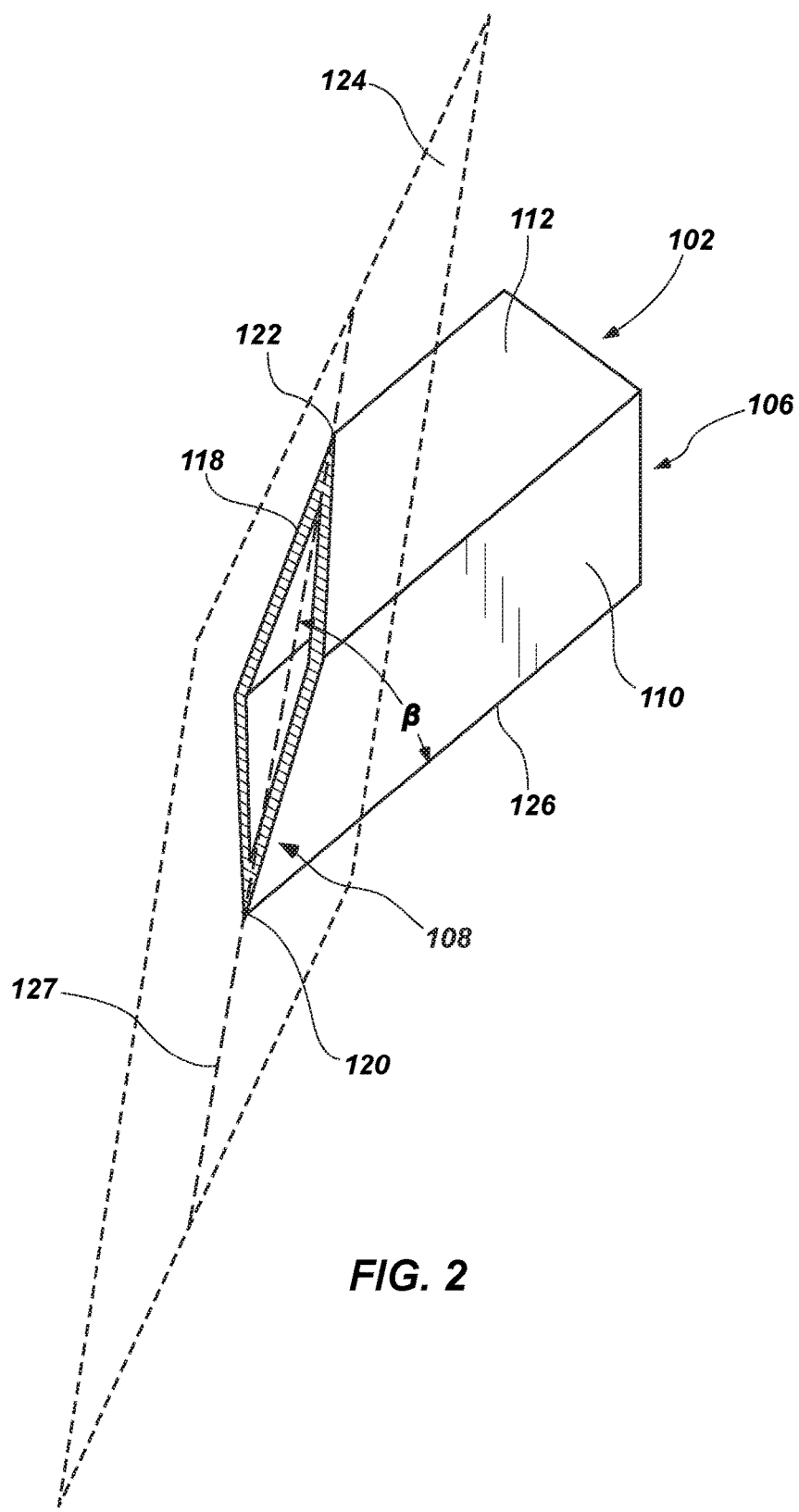
FIG. 2 is a perspective view of an angled end of a hitch member of the trailer hitch assembly according to an embodiment of the invention.

FIG. 2 is a perspective view of the first angled end 108 of the first tubular element 102 of the trailer hitch assembly 100 according to an embodiment of the invention. As illustrated in FIG. 2, the first planar end surface 118 of the first angled end 108 of the first tubular element 102 may extend along a plane 124 (shown in broken lines). The first edge 120 of the first tubular element 102 may define a line 126 along a longitudinal length of the trailer hitch assembly 100. The plane 124 may include an imaginary line 127 extending in the plane 124 from the first edge 120 to the second edge 122 of the first tubular element 102. In some embodiments, an acute angle β may be defined between the line 126 defined by the first edge 120 and the imaginary line 127 extending in the plane 124.

In embodiments where the first planar end surface 118 extends from one side wall 110 of the first tubular element 102 to the other side wall 110 of the first tubular element 102, the imaginary line 127 may extend from a middle of one side wall 110 of the first tubular element 102 to a middle of another side wall 110 of the first tubular element 102. In these embodiments, the acute angle β may be defined between a side wall 110 of first tubular element 102 and the imaginary line 127 extending through the plane 124.

In some embodiments, the acute angle β may be less than about 90 degrees. In other embodiments, the acute angle β may be less than 60 degrees. In other embodiments, the acute angle β may be less than 45 degrees. In yet other embodiments, the acute angle β may be less than 30 degrees. In some embodiments, the acute angle β is configured such that the security pin 138 can extend simultaneously through both the first and second hole 136, 156 (FIG. 1) when the first and second tubular elements 102, 104 are aligned.

In other embodiments, an obtuse angle may be defined between the line 126 defined by the first edge 120 and the imaginary line 127 extending in the plane 124.

Figure 3:
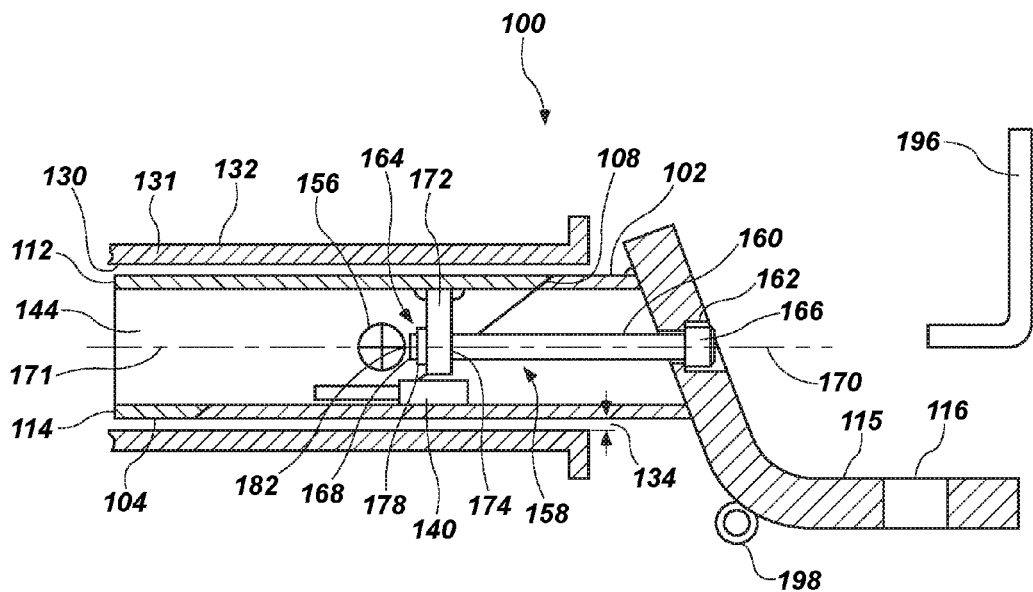
FIG. 3 is a partial cross-sectional side view of the trailer hitch assembly of FIG. 1 inserted into a trailer hitch receptacle.
Figure 8:
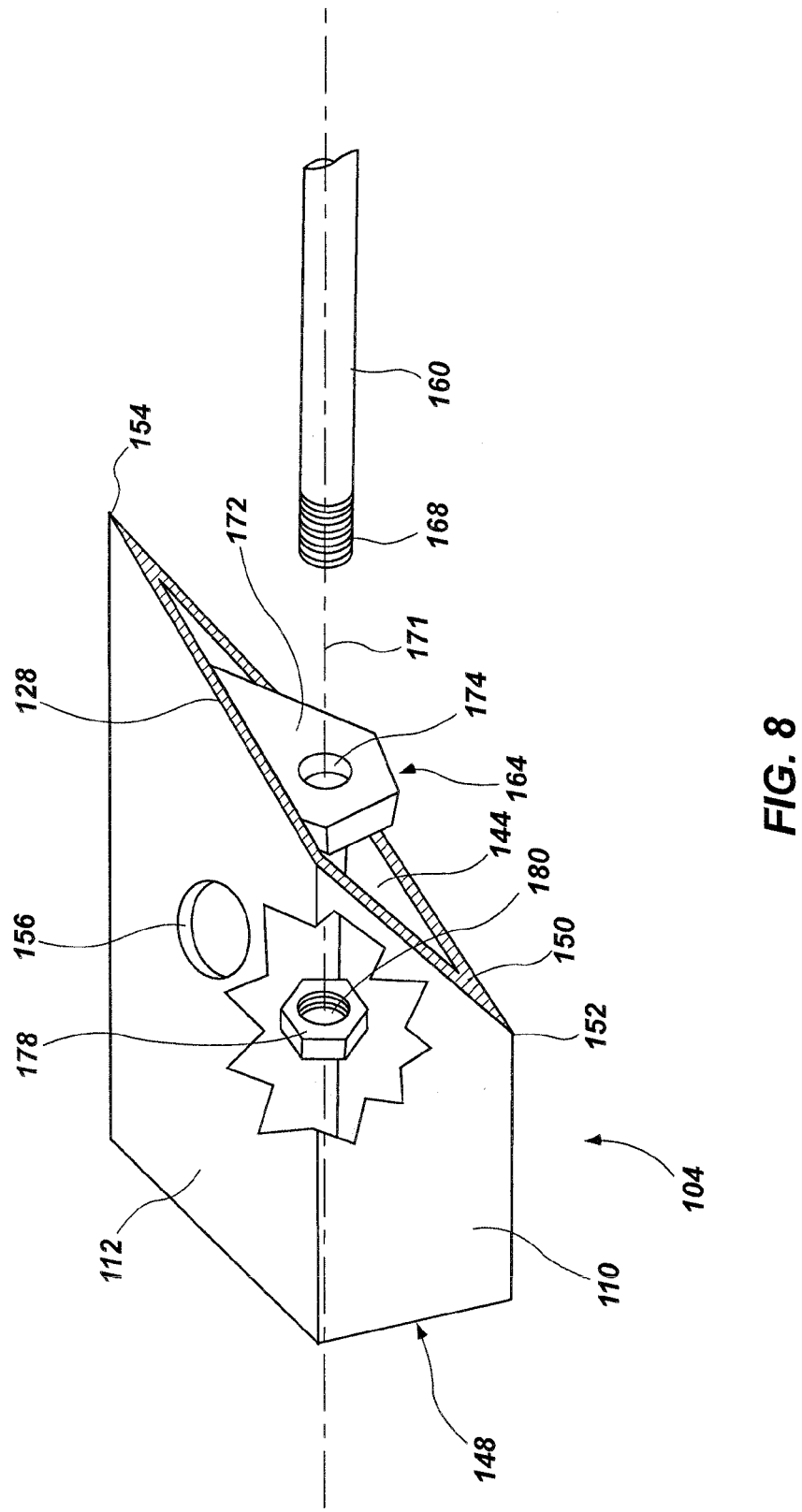
FIG. 8 is a perspective view of a hitch member and nut mount of a trailer hitch assembly according to an embodiment of the present disclosure.

FIG. 3 is a partial cross-sectional side view of the trailer hitch assembly 100 of FIG. 1 inserted into a trailer hitch receptacle 132. The trailer hitch assembly 100 may include an actuator 158 for causing the first tubular element 102 to diagonally displace and misalign relative to the second tubular element 104 after the trailer hitch assembly 100 has been inserted into the trailer hitch receptacle 132. The actuator 158 may include one or more elements located in both the first tubular element 102 and second tubular element 104. In some embodiments, the actuator 158 includes an elongated bolt 160 and a first actuator hole 162 extending through the ball mount 115 of the first tubular element 102. The elongated bolt 160 may have a head end 166 and a threaded end 168, as shown in FIG. 3. In some embodiments, the first actuator hole 162 may be countersunk to accommodate the head end 166 of the elongated bolt 160. The actuator 158 may further include the nut mount 164 secured within the second tubular element 104. The nut mount 164 may include the secured portion 172 secured to the fourth edge 154 and to at least a portion of each of the upper wall 112 and a side wall 110 inside the second tubular element 104. The secured portion 172 may have a second actuator hole 174 extending therethrough. The nut mount 164 may include the nut 178. The second actuator hole 174 may be countersunk for accommodating and securing the nut 178 therein. The nut 178 may have a first threaded center hole 180 (FIG. 8). When in use, the elongated bolt 160 may extend from the first actuator hole 162 in the ball mount 115 of the first tubular element 102 to the nut mount 164 secured inside of the second tubular element 104. The elongated bolt 160 may further extend along and be centered on the first central axis 170 of the first tubular element 102 when in use. The first central axis 170 of the first tubular element 102 may extend through a center of the first actuator hole 162 in the ball mount 115 as shown in FIG. 3. In use, the threaded end 168 of the elongated bolt 160 may be threaded into the first threaded center hole 180 of the nut 178. Further details regarding the secured portion 172 are discussed below with reference to FIG. 8.

A tightening tool 196 may be configured to engage the head end 166 of the elongated bolt 160. A user may use the tightening tool 196 to turn the elongated bolt 160 to cause diagonal displacement and misalignment of the first tubular element 102 relative to the second tubular element 104. In some embodiments, elongated bolt 160 need only be rotated by 180° to cause sufficient diagonal displacement and misalignment of the first tubular element 102 relative to the second tubular element 104 to tighten the trailer hitch assembly 100 within the trailer hitch receptacle 132. The tightening tool 196 may be sized and shaped to enable a user to engage the head end 166 of the elongated bolt 160 and turn the elongated bolt 160 even when there is a ball mounted in the ball mount hole 116 of the ball mount 115. In some embodiments, the tightening tool 196 may be permanently attached to the head end 166 of the elongated bolt 160. In other embodiments, the tightening tool 196 may be separate and distinct from the elongated bolt 160. In embodiments where the tightening tool 196 is separate and distinct from the elongated bolt 160, the trailer hitch assembly 100 may further include a holder 198 configured to securely hold the tightening tool 196 when the tightening tool 196 is not in use. In some embodiments, the holder 198 may include a magnet for securing the tightening tool 196 to the trailer hitch assembly 100. The holder 198 (e.g., magnet) may be located in the location shown in FIG. 3 or in another location, such as within a recess formed in the ball mount 115. In other embodiments, the holder 198 may include a loop of metal secured to the trailer hitch assembly 100 through which the tightening tool 196 may be inserted when not in use.

The second tubular element 104 may include a second hole 156 in one of the side walls 110 for receiving the security pin 138 (FIG. 1). A center of the second hole 156 may be substantially centered between the upper wall 112 and lower wall 114 of the second tubular element 104. Furthermore, the second hole 156 may be longitudinally located between an end of the third edge 152 on the second angled end 128 and an end of the fourth edge 154 on the second angled end 128 of the second tubular element 104. The second hole 156 may be further located such that the center of the second hole 156 is at least substantially aligned with the center of the first hole 136 (FIG. 1) when the first tubular element 102 and the second tubular element 104 are aligned, such that the security pin 138 (FIG. 1) can simultaneously extend through both the first hole 136 and the second hole 156 while engaging the trailer hitch receptacle 132. When the security pin 138 (FIG. 1) extends simultaneously through both the first hole 136 (FIG. 1) and the second hole 156 and engages the trailer hitch receptacle 132, the first and second holes 136, 156 may have sufficient clearance around the security pin 138 to enable diagonal displacement and misalignment of the first tubular element 102 relative to the second tubular element 104. In some embodiments, the second hole 156 may have a larger diameter than a diameter of the first hole 136 (FIG. 1) of the first tubular element 102. The larger diameter of the second hole 156 may facilitate the first tubular element 102 to be diagonally displaced relative to the second tubular element 104. In some embodiments, the first and second holes 136, 156 may have a circular, oval, square, or any other geometric shape. In some embodiments, the first and second holes 136, 156 may have different shapes in relation to each other.

The trailer hitch receptacle 132 may include interior walls 130 sized and configured to receive the trailer hitch assembly 100 therein when in use. The second end 148 of the second tubular element 104 may be configured to be inserted into the trailer hitch receptacle 132. When the trailer hitch assembly 100 is inserted into the trailer hitch receptacle 132 there may be some distance 134 between the side walls 110, lower wall 114, and/or the upper wall 112 of either tubular element 102, 104 and the interior walls 130 of the trailer hitch receptacle 132. When the trailer hitch assembly 100 is inserted into the trailer hitch receptacle 132, the elongated bolt 160 may be inserted through the first actuator hole 162 of the ball mount 115 and the threaded end 168 of the elongated bolt 160 may be engaged with the first threaded center hole 180 (FIG. 8) of the nut 178. The elongated bolt 160 may be turned with the tightening tool 196. Turning of the elongated bolt 160 may bring the first tubular element 102 and the second tubular element 104 closer together, if the two tubular elements 102, 104 were separated initially. The elongated bolt 160 may be turned at least until the first angled end 108 of the first tubular element 102 contacts the second angled end 128 of the second tubular element 104. Upon contact of the first angled end 108 of the first tubular element 102 with the second angled end 128 of the second tubular element 104, and upon continued turning of the elongated bolt 160, the first angled end 108 of the first tubular element 102 may slide along the second angled end 128 of the second tubular element 104. The sliding of the first tubular element 102 relative to the second tubular element 104 may result in diagonal and lateral displacement and misalignment of the first and second tubular elements 102, 104 relative to each other. The diagonal and lateral displacement and misalignment caused by sliding of the first tubular element 102 relative to the second tubular element 104 may reduce the distance 134 between the side walls 110, lower wall 114, and/or the upper wall 112 of either tubular element 102, 104 and the interior walls 130 of the trailer hitch receptacle 132 and may result in the side walls 110, upper wall 112, and/or lower wall 114 of one or both of the first and second tubular elements 102, 104 pressing against the interior walls 130 of the trailer hitch receptacle 132.

In embodiments where the first planar surface 118 extends from the first edge 120 of the first tubular element 102 to the second edge 122 of the first tubular element 102 diagonally opposite the first edge 120 and where the acute angle β is defined by imaginary line 127 and the line 126 defined by the first edge 120, diagonal displacement of the two tubular elements 102, 104 relative to each other may result in each side wall 110, the upper wall 112, and the lower wall 114 of the each tubular element 102, 104 pressing against an interior wall 130 of the trailer hitch receptacle 132. In embodiments where the first planar surface 118 extends from one side wall 110 of the first tubular element 102 to the other side wall 110 of the first tubular element 102 diagonal displacement of the two tubular elements 102, 104 relative to each other may result in the side walls 110 of each tubular element 102, 104 pressing against interior walls 130 of the trailer hitch receptacle 132. The contact of side walls 110, upper wall 112, and/or lower wall 114 of either tubular element 102, 104 against the interior walls 130 of the trailer hitch receptacle 132 may increase stability and reduce (e.g., prevent) wobbling of the trailer hitch assembly 100 within the trailer hitch receptacle 132 during use.

Conventional trailer hitches may have some wobble between the trailer hitch and the trailer hitch receptacle when the trailer hitch is inserted in a trailer hitch receptacle. The wobble from side of side of the trailer hitch within the trailer hitch may begin as a minute movement, and when a vehicle employing the trailer hitch is moving down a hill, the wobble may be increased exponentially as inertia moves the trailer back and forth. The magnified wobble at the back end of the trailer can result in the rear of the trailer swaying or "fish tailing" several feet, which in turn can be a dangerous side effect of hauling long trailers. Reducing the wobble of the trailer hitch within the trailer hitch receptacle, due to the trailer hitch being secured in the above described manner, may reduce the extent of sway or "fish tailing" that occurs at the back end of the trailer, and, thus, may increase the safety of hauling trailers, especially long trailers. Furthermore, providing contact between the walls of the trailer hitch assembly 100 and the interior walls 130 of the trailer hitch receptacle 132 may add mechanical interference between the trailer hitch assembly 100 and trailer hitch receptacle 132, which may reduce the likelihood of the trailer hitch assembly 100 being pulled out of the trailer hitch receptacle 132 while pulling a trailer, should the security pin 138 (FIG. 1) fail or forget to be inserted by a user.

The acute angle β (FIG. 2) may be relatively small (e.g., less than about 45 degrees) or relatively large (e.g., more than about 45 degrees). When the acute angle β (FIG. 2) is smaller, the lateral displacement of the tubular elements 102, 104 relative to each other and relative to an amount of sliding upon actuation may be smaller. Therefore, when the distance 134 between the side walls 110, upper wall 112, and/or lower wall 114 of the tubular elements 102, 104 and the interior walls 130 of the trailer hitch receptacle 132 is relatively large, a larger acute angle β may facilitate in pressing the side walls 110, upper wall 112, and/or lower wall 114 of the tubular elements 102, 104 against the interior walls 130 of the trailer hitch receptacle 132. On the other hand, when the distance 134 between the side walls 110, upper wall 112, and/or lower wall 114 of the tubular elements 102, 104 and the interior walls 130 of a trailer hitch receptacle 132 is relatively small, a smaller acute angle β (FIG. 2) may be sufficient.

Figure 4:
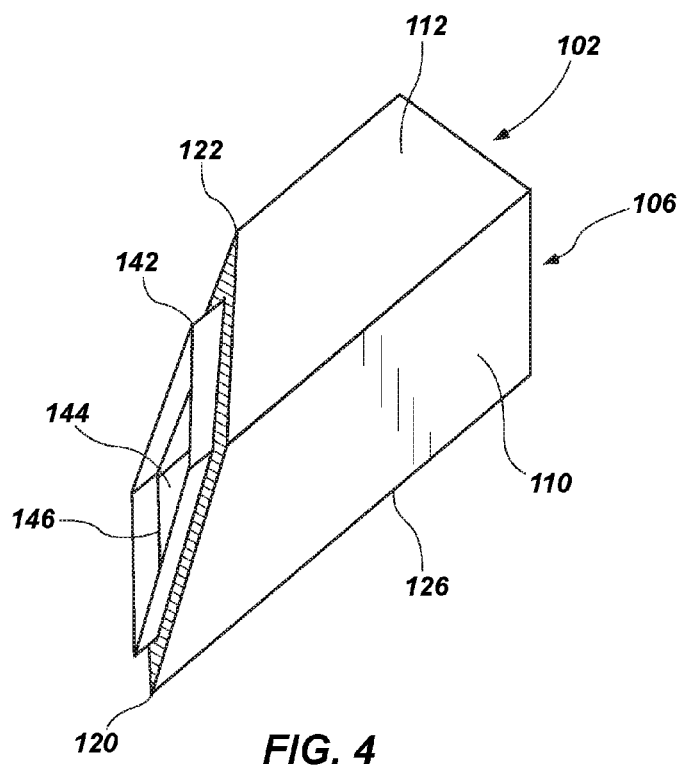
FIG. 4 is a perspective view of a first hitch member of the trailer hitch assembly of FIG. 1.

FIG. 4 is a perspective view of a first tubular element 102 of the trailer hitch assembly 100 of FIG. 1. As illustrated in FIG. 4, in other embodiments, the trailer hitch assembly 100 may include a guide lip 142 instead of or in addition to the at least one guide projection 140. The guide lip 142 may protrude from an interior surface 144 (see FIG. 3 of at least one of the first and second tubular elements 102, 104 in a longitudinal direction and proximate an angled end of the tubular element to which the guide lip 142 is attached. The guide lip 142 may have sufficient clearance relative to the tubular element to which the guide lip 142 is not attached to enable the two tubular elements 102, 104 to be diagonally displaced relative to one another. In some embodiments, the guide lip 142 may protrude from an entire perimeter 146 of an angled end 108, 128 of the tubular element 102, 104 to which the guide lip 142 is attached. In other embodiments, the guide lip 142 may run along only a portion or multiple portions of the entire perimeter 146 of an angled end 108, 128 of one of the tubular elements 102, 104 and may protrude from a complementary portion or multiple portions of the entire perimeter 146 of the other of the tubular elements 102, 104. For example, the guide lip 142 may be attached to a portion of the first angled end 108 of the first tubular element 102 and a complementary guide lip 142 may be attached to the second angled end 128 of the second tubular element 104. In yet other embodiments, the guide lip 142 may be attached to only a portion of the entire perimeter 146 of only one of the two tubular elements 102, 104. For example, the guide lip 142 may be attached only to a portion of the first angled end 108 of the first tubular element 102. In other embodiments, the trailer hitch assembly 100 may include at least one guide projection 140 and a guide lip 142.

Figure 5:
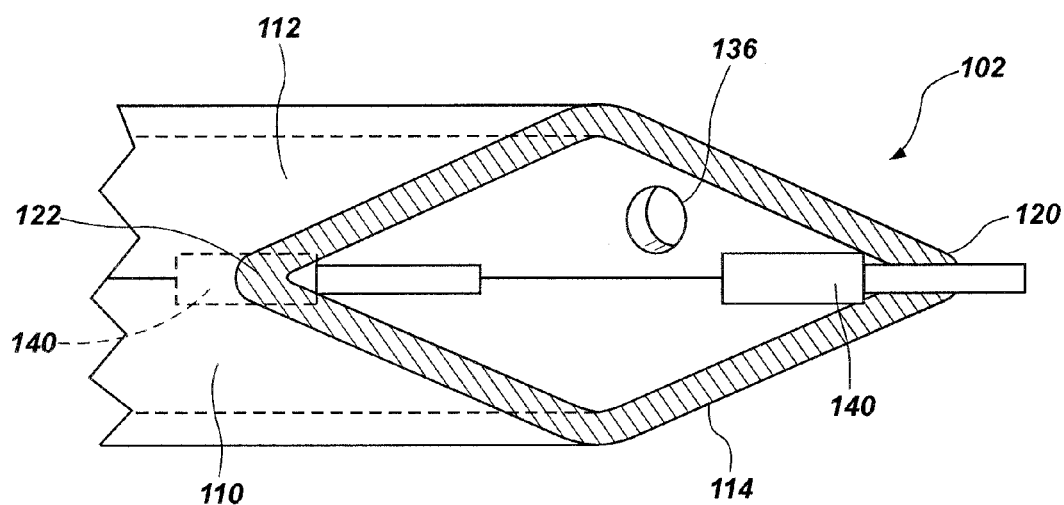
FIG. 5 is an enlarged partial side view of an angled end of a first hitch member of the trailer hitch assembly of FIG. 1.

FIG. 5 is an enlarged partial side view of an angled end of a first tubular element 102 of the trailer hitch assembly 100 of FIG. 1. The at least one guide projection 140 may include two guide projections 140. In some embodiments, one of the two guide projections 140 may be secured to an edge within one of the two tubular elements 102, 104 and the other of the two guide projections 140 may be secured to a diagonally opposite edge within the same tubular element 102 or 104. In other embodiments, one of the two guide projections 140 may be secured to an edge within one of the two tubular elements 102, 104 and the other of the two guide projections 140 may be secured to a diagonally opposite edge of the other of the two tubular elements 102, 104. For example, the at least one guide projection 140 may include a single guide projection 140 secured to one edge inside of the first tubular element 102 and protruding from the first angled end 108 and another single guide projection 140 secured to one edge inside of the second tubular element 104 and protruding from the second angled end 128. In embodiments comprising two guide projections 140, the two guide projections 140 may be attached to any edge within either the first tubular element 102 or the second tubular element 104, in any configuration. For example, in some embodiments, one of the two guide projections 140 may be attached to the first edge 120 of the first tubular element 102 and the other of the two guide projections 140 may be attached to the second edge 122 of the first tubular element 102. In other embodiments, one of the two guide projections 140 may be attached to the third edge 152 of the second tubular element 104 and the other of the two guide projections 140 may be attached to the fourth edge 154 of the second tubular element 104. In yet another embodiment, one of the two guide projections 140 may be attached to the second edge 122 of the first tubular element 102 and the other of the two guide projections 140 may be attached to the fourth edge 154 of the second tubular element 104. In yet another embodiment, one of the two guide projections 140 may be attached to the first edge 120 of the first tubular element 102 and the other of the two guide projections 140 may be attached to the third edge 152 of the second tubular element 104.

The at least one guide projection 140 may be disposed and configured such that there is sufficient clearance between a protruding portion of the at least one guide projection 140 and the tubular element 102, 104 in which the protruding portion may be inserted to facilitate diagonal displacement and misalignment of the tubular elements 102, 104 relative to each other. In some embodiments, the at least one guide projection 140 may be secured within at least one of the two tubular elements 102, 104 such that upon actuation and diagonal displacement of the two tubular elements 102, 104 relative to one another, a portion of the at least one guide projection 140 extending into the tubular element 102, 104 to which the at least one guide projection 140 is not secured may be moved toward the central axis of the tubular element 102, 104 to which the at least one guide projection 140 is not secured. For example, the at least one guide projection 140 may be secured within the first tubular element 102 and when the two tubular elements 102, 104 are aligned, a portion of the at least one projection may extend into the second tubular element 104. Upon actuation and diagonal displacement of the two tubular elements 102, 104 relative to one another, the portion of the at least one guide projection 140 extending into the second tubular element 104 may be moved toward the second central axis 171 of the second tubular element 104. In embodiments where at least one guide projection 140 is secured within both tubular elements 102, 104, upon actuation and diagonal displacement of the two tubular elements 102, 104 relative to one another, the at least one guide projection 140 secured within the first tubular element 102 and the at least one projection 140 secured within the second tubular element 104 move toward each other.

The at least one guide projection 140 may be configured to facilitate keeping the first tubular element 102 and second tubular element 104 together and generally aligned through mechanical interference when the actuator 158 (FIG. 3) is not engaged (or is loosely engaged) with both the first tubular element 102 and second tubular element 104. For example, the at least one guide projection 140 may provide sufficient mechanical interference between the first tubular element 102 and second tubular element 104 to hold the two tubular elements 102, 104 together and generally aligned when the elongated bolt 160 is merely inserted into the first actuator hole 162 of the ball mount 115 but is not threaded into the first threaded center hole 180 (FIG. 8) of the nut 178 secured in the nut mount 164. The orientation of the at least one guide projection 140 and resulting mechanical interference between the at least one guide projection 140 and both tubular elements, 102, 104 may assist a user to keep the first tubular element 102 and second tubular element 104 together and generally aligned when inserting the trailer hitch assembly 100 into a trailer hitch receptacle 132 without first threading the elongated bolt 160 into the first threaded center hole 180 of the nut 178 secured in the secured portion 172 of the nut mount 164. In some embodiments, the at least one guide projection 140 may be configured to facilitate aligning the first tubular element 102 with the second tubular element 104 while both tubular elements 102, 104 are at least partially within the trailer hitch receptacle 132 (FIG. 3).

The at least one guide projection 140 may keep the trailer hitch assembly 100 aligned for easy insertion into the trailer hitch receptacle 132. The at least one guide projection 140 may also reduce stress on the elongated bolt 160 and/or nut 178 upon actuation of the actuator 158. Furthermore, the at least one guide projection 140 may help to reduce damage caused to the actuator 158 and elements thereof when the trailer hitch assembly 100 is not being used. For example, when the trailer hitch assembly 100 is not in use within trailer hitch receptacle 132, without the at least one guide projection 140, the two tubular elements 102 and 104 may become displaced relative to each other to such a point that stress would be placed on the secured portion 172, nut mount 164, nut 178, and elongated bolt 160. Due to the stress, the threads of the elongated bolt 160, nut 178, or second threaded center hole 182 (FIG. 9) may become stripped. Furthermore, the stress may cause the nut 178 to dislodge within the secured portion 172. Moreover, the stress may break components of the actuator 158. Thus, by including the at least one guide projection 140, the two tubular elements 102, 104 may be prevented from displacing relative to each other to points that cause damaging stress loads on the actuator 158 and components thereof.

Figure 6:
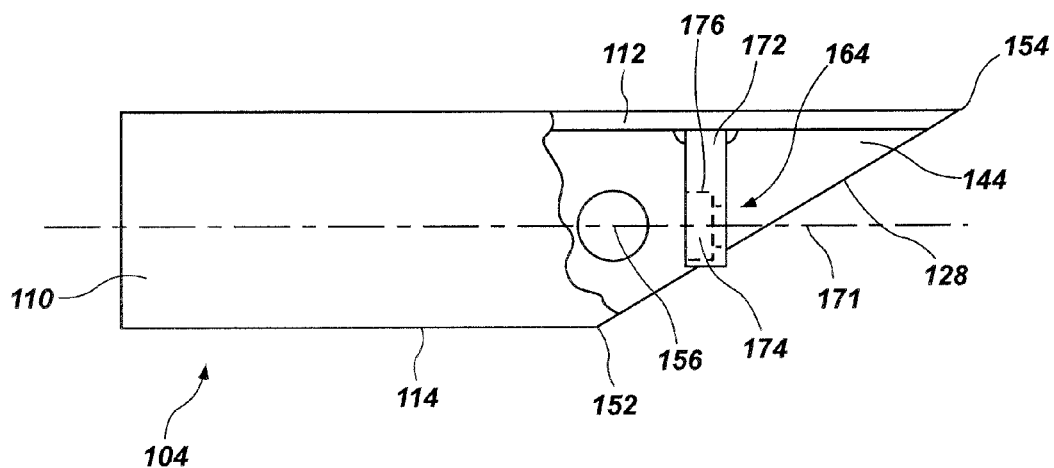
FIG. 6 is a cutaway side view of a second hitch member and nut mount of the trailer hitch assembly of FIG. 1.
Figure 7:
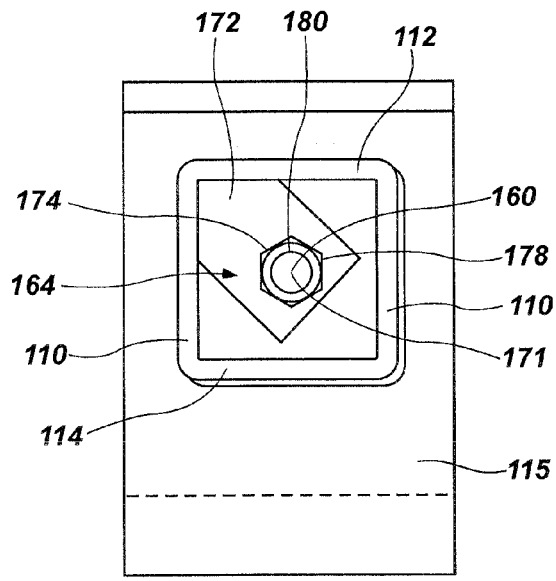
FIG. 7 is an end view of the nut mount and trailer hitch assembly of FIG. 1.

FIG. 6 is a cutaway side view of a second tubular element 104 and nut mount 164 of the trailer hitch assembly 100 of FIG. 1. FIG. 7 is an end view of the nut mount 164 and trailer hitch assembly 100 of FIG. 6. Referring to both FIGS. 6 and 7, in some embodiments and as discussed above, the nut mount 164 of the actuator 158 may include the secured portion 172 secured to the third edge 152 and at least a portion of each of the lower wall 114 and a side wall 110 inside the second tubular element 104. The nut mount 164 may be secured within the second tubular element 104 at a location between the second hole 156 and the end of the third edge 152 on the second angled end 128, relative to the longitudinal length of the trailer hitch assembly 100. Furthermore, when the first tubular element 102 is aligned with the second tubular element 104, the nut mount 164 may be closer, in relation to the longitudinal length of the trailer hitch assembly 100, to the ball mount 115 of the first tubular element 102 than either the first hole 136 in the first tubular element 102 or the second hole 156 of the second tubular element 104. The placement of the nut mount 164 closer to the ball mount 115 than the first and second holes 136, 156 enables the elongated bolt 160 to be centered on the first central axis 170 of the first tubular element 102 and the second central axis 171 of the second tubular element 104 without interfering with the security pin 138 extending through the first hole 136 and second hole 156. The secured portion 172 of the nut mount 164 may be a thick bar or plate of metal. The second central axis 171 of the second tubular element 104 may extend through a center of the second actuator hole 174. The secured portion 172 may include the second actuator hole 174. The second actuator hole 174 may include an enlarged portion 176 for accommodating the nut 178. The enlarged portion 176 of the second actuator hole 174 may have, for example, an octagonal shape, circular shape, hexagonal shape, or any other geometric shape for accommodating the nut 178 inside.

FIG. 8 is a perspective view of a tubular element and nut mount 164 of a trailer hitch assembly 100 according to an embodiment of the present disclosure. As previously discussed, the nut 178 may be secured in the enlarged portion 176 of the second actuator hole 174 and may have the first threaded center hole 180 extending therethrough, which may be threaded to match threads of the threaded end 168 of the elongated bolt 160. The nut 178 may be secured to the secured portion 172 by, for example, welding, press fitting, adhesive, tape, glue, and/or mechanical interference. When the first tubular element 102 is aligned with the second tubular element 104, the threaded end 168 of the elongated bolt 160 may be received into first threaded center hole 180 of the nut 178 (FIGS. 3 and 8). Securing the nut 178 within the enlarged portion 176 of the second actuator hole 174 may facilitate engagement of the threaded end 168 of the elongated bolt 160 with the nut mount 164 while the first tubular element 102 and the second tubular element 104 are disposed in the trailer hitch receptacle 132 (FIG. 3). Furthermore, securing the nut 178 within the enlarged portion 176 of the second actuator hole 174 may remove the necessity to have a tool hold the nut 178 in place while the elongated bolt 160 is threaded into the first threaded center hole 180 of the nut 178. The second actuator hole 174 may have, for example, an octagonal shape, circular shape, hexagonal shape, or any other geometric shape.

Figure 9:
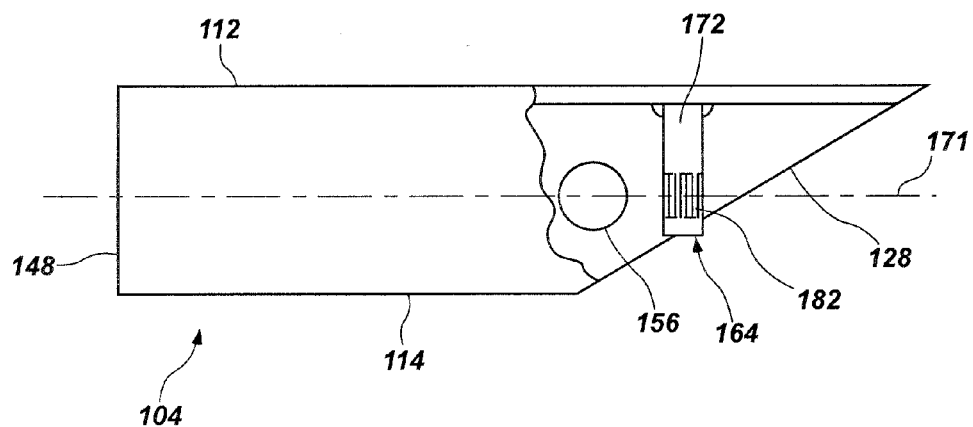
FIG. 9 is a side view of a hitch member and nut mount of a trailer hitch assembly according to another embodiment of the present disclosure.

FIG. 9 is a side view of a tubular element and nut mount 164 of a trailer hitch assembly 100 according to another embodiment of the present disclosure. In some embodiments, the nut mount 164 may not include a second actuator hole 174 or a nut 178. Rather, the secured portion 172 of the nut mount 164 may include a second threaded center hole 182 extending through the secured portion 172. The threads of the second threaded center hole 182 may complementarily match the threads of the threaded end 168 of the elongated bolt 160 so that the elongated bolt 160 can be received directly into the second threaded center hole 182 of the secured portion 172.

Figure 10:
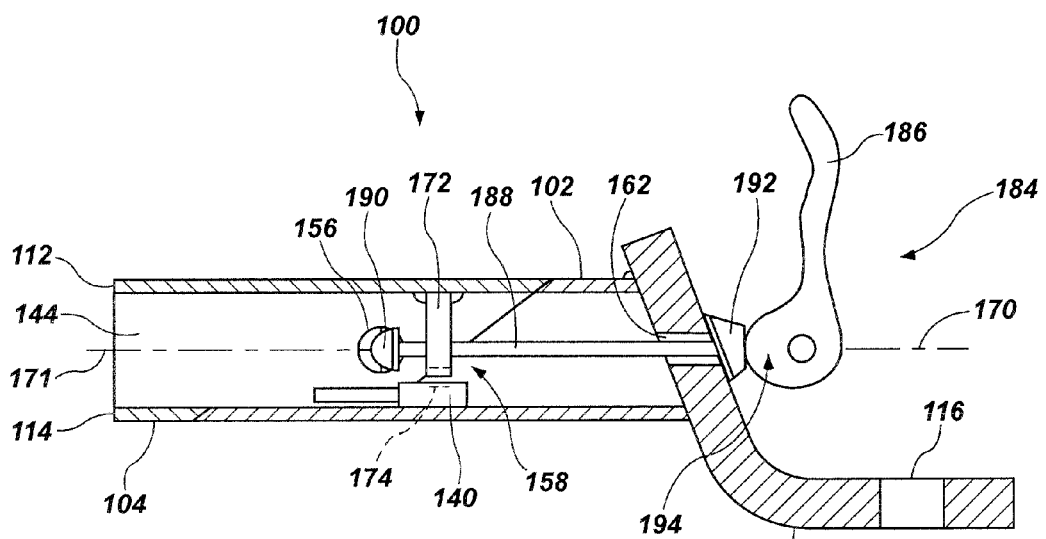
FIG. 10 is a side cross-sectional view of an actuator and a trailer hitch assembly according to an embodiment of the present disclosure.

FIG. 10 is a side cross-sectional view of the actuator 158 and trailer hitch assembly 100 according to an embodiment of the present disclosure. As shown, in some embodiments of the trailer hitch assembly 100, the actuator 158 may include a quick release cam lever system 184, such as a quick release cam lever system similar to the quick release cam lever system discussed in U.S. Pat. No. 6,260,931 to Stewart, filed Sep. 23, 1997, instead of an elongated bolt 160 and nut 178. The disclosure of U.S. Pat. No. 6,260,931 is incorporated herein in its entirety by this reference. The quick release cam lever system 184 may include a cam lever 186 at one end of a rod 188 and an adjustment nut 190 on another end of the rod 188. The quick release cam lever system 184 may further include a contact disk 192 disposed next to the cam lever 186. The rod 188 may extend through first actuator hole 162 of the ball mount 115 and though the second actuator hole 174 of the secured portion 172. The adjustment nut 190 may be attached to an end of the rod 188 protruding from the secured portion 172, as illustrated in FIG. 10. The adjustment nut 190 may be configured to change an initial distance between the adjustment nut 190 and the cam lever 186 along the rod 188. The contact disk 192 and cam lever 186 may be attached to another end of the rod 188 protruding from the ball mount 115, as illustrated in FIG. 10. The cam lever 186 may further include a cam lobe portion 194. During use, the adjustment nut 190 may be adjusted such that, when the cam lever 186 is brought into a position substantially perpendicular to the rod 188 and the cam lobe portion 194 is brought into contact with the contact disk 192, the first angled end 108 of the first tubular element 102 is at least brought into contact with the second angled end 128 of the second tubular element 104. The adjustment nut 190 may further be adjusted such that, when the cam lever 186 is brought into a position substantially perpendicular to the rod 188 and the cam lobe portion 194 is brought into contact with the contact disk 192, the first angled end 108 of the first tubular element 102 slides along the second angled end 128 of the second tubular element 104. The sliding of the first tubular element 102 relative to the second tubular element 104 may result in diagonal and lateral displacement and misalignment of the first and second tubular elements 102, 104 relative to each other. The diagonal and lateral displacement and misalignment caused by sliding of the first tubular element 102 relative to the second tubular element 104 may reduce the distance 134 between the side walls 110, lower wall 114, and/or the upper wall 112 of either tubular element 102, 104 and the interior walls 130 of the trailer hitch receptacle 132 and may result in the side walls 110, upper wall 112, and/or lower wall 114 of one or both of the first and second tubular elements 102, 104 pressing against the interior walls 130 of the trailer hitch receptacle 132.

The quick release cam lever system 184 may keep the first tubular element 102 connected to the second tubular element 104 even when the trailer hitch assembly 100 is not in use. Furthermore, the quick release cam lever system 184 may remove a need to have a tightening tool 196 to engage the elongated bolt 160 (FIG. 3) in order to cause diagonal displacement and misalignment. With the quick release cam lever system 184, the trailer hitch assembly 100 may remain a single connected unit without disconnecting the first tubular element 102 from the second tubular element 104. Moreover, the quick release cam lever system 184 may decrease the amount of time needed to secure the trailer hitch assembly 100 within a trailer hitch receptacle 132.

Figure 11:
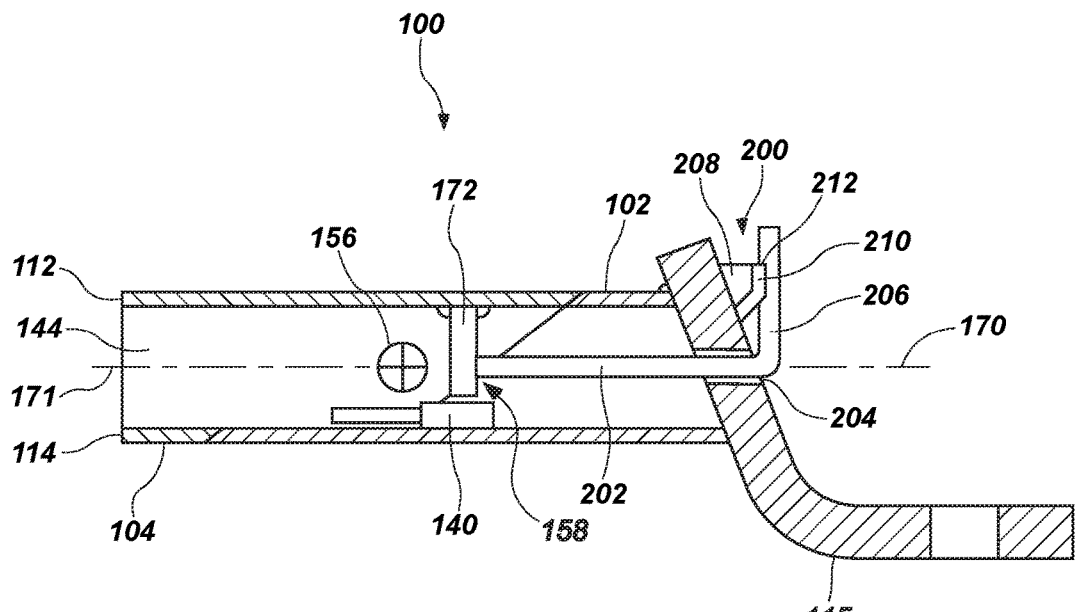
FIG. 11 is a side cross-sectional view of an actuator and a trailer hitch assembly according to another embodiment of the present disclosure.

FIG. 11 is a side cross-sectional view of an actuator 158 of the trailer hitch assembly 100 according to another embodiment of the present disclosure. As shown, in some embodiments, the actuator 158 may include a cam lock system 200 instead of the elongated bolt 160 and nut 178. The cam lock system 200 may include the secured portion 172 of the nut mount 164 (FIG. 3) and a cam rod 202. The cam rod 202 may include a handle portion 206 for turning the cam rod 202. The actuator 158 may further include a cam lock 208 secured to a portion of the ball mount 115 above the straight hole 204. The cam lock 208 may include an inclined plane 210 and a notch 212. For example, the inclined plane 210 may be defined by a chamfered edge or a triangular member. The cam rod 202 may be rotatably secured within the secured portion 172 and may extend through the first actuator hole 162 (FIG. 3) of the ball mount 115. In some embodiments, the first actuator hole 162 may include a straight hole 204 through which the cam rod 202 extends, as illustrated in FIG. 11.

During use, the trailer hitch assembly 100 may be inserted into a trailer hitch receptacle 132 with the cam rod 202 in a position outside of the notch 212 of the cam lock 208. With the trailer hitch assembly 100 inserted in the trailer hitch receptacle 132, the handle portion 206 of the cam rod 202 may be brought across the inclined plane 210 of the cam lock 208 and into the notch 212, locking the cam rod 202 in place. The action of bringing the handle portion 206 of the cam rod 202 into the notch 212 of the cam lock 208 may force the cam rod 202 to move along the longitudinal length of the trailer hitch assembly 100 in a direction extending from the second tubular element 104 to the first tubular element 102. When the cam rod 202 moves along the longitudinal length of the trailer hitch assembly 100, the cam rod 202 may bring the secured portion 172 of the nut mount 164 (FIG. 3) closer to the ball mount 115. A length of the cam rod 202 and corresponding size of the inclined plane 210 of the cam lock 208 may be configured such that, when the handle portion 206 of the cam rod 202 is brought across the inclined plane 210 of the cam lock 208 and disposed into the notch 212, the first angled end 108 of the first tubular element 102 is at least brought into contact with the second angled end 128 of the second tubular element 104. The length of the cam rod 202 and corresponding size of the inclined plane 210 of the cam lock 208 may be further configured such that, when the handle portion 206 of the cam rod 202 is brought across the inclined plane 210 of the cam lock 208 and disposed into the notch 212, the first angled end 108 of the first tubular element 102 slides along the second angled end 128 of the second tubular element 104.

The sliding of the first tubular element 102 relative to the second tubular element 104 may result in diagonal and lateral displacement and misalignment of the first and second tubular elements 102, 104 relative to each other. The diagonal and lateral displacement and misalignment caused by sliding of the first tubular element 102 relative to the second tubular element 104 may reduce the distance 134 between the side walls 110, lower wall 114, and/or the upper wall 112 of either tubular element 102, 104 and the interior walls 130 of the trailer hitch receptacle 132 (FIG. 3) and may result in the side walls 110, upper wall 112, and/or lower wall 114 of one or both of the first and second tubular elements 102, 104 pressing against the interior walls 130 of the trailer hitch receptacle 132.

The cam lock system 200 may keep the first tubular element 102 connected to the second tubular element 104 even when the trailer hitch assembly 100 is not in use. Furthermore, the cam lock system 200 may remove a need to have a tightening tool 196 to engage the elongated bolt 160 in order to cause diagonal displacement and misalignment. With the cam lock system 200, the trailer hitch assembly 100 may remain a single connected unit without disconnecting the first tubular element 102 from the second tubular element 104. Moreover, the cam lock system 200 may decrease the amount of time needed to secure the trailer hitch assembly 100 within a trailer hitch receptacle 132.

Figure 12:
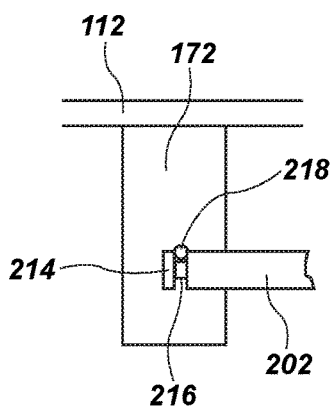
FIG. 12 is an enlarged cross-sectional view of a portion of the actuator of FIG. 11.

FIG. 12 is an enlarged cross-sectional view of the secured portion 172 and cam rod 202 of the actuator 158 of FIG. 11.

As shown, the cam rod 202 may have a slotted end 214 having a slot 216 extending radially at least partially around at least a portion of cam rod 202. The cam lock system 200 may include at least one slot pin 218 secured in the secured portion 172. The slotted end 214 of the cam rod 202 may be secured in the secured portion 172 by the at least one slot pin 218 extending perpendicular to the cam rod 202 and through a portion of the slot 216 of the slotted end 214 of the cam rod 202. The slotted end 214 of the cam rod 202 being secured by at least one slot pin 218 may enable the cam rod 202 to be rotatably secured within the secured portion 172.

Figure 13:
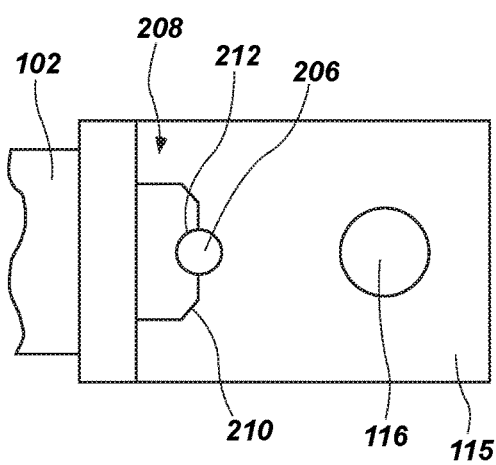
FIG. 13 is a top view of a portion of the actuator and a portion of the trailer hitch assembly of FIG. 11.

FIG. 13 is a top view of the cam lock 208, handle portion 206 of the cam rod 202, and ball mount 115 of the trailer hitch assembly 100 of FIG. 11. As shown, the notch 212 of the cam lock 208 may be sized and shaped to receive the handle portion 206 of the cam rod 202 at least partially within the notch 212. Furthermore, as depicted, the inclined plane 210 may facilitate bringing the handle portion 206 of the cam rod 202 from an unlocked position to a locked position. The cam lock 208 may have a generally rectangular shape with portions of edges of the rectangular shape missing and forming the inclined plane 210 (e.g., a chamfered cam lock 208). However, the present disclosure is not so limited. The cam lock 208 may have a semi-circular shape with the notch 212 located at midpoint of a peripheral edge of the semi-circular shape. Furthermore, the cam lock 208 may have any geometric shape (e.g., a triangular shape) having a notch therein to secure the handle portion 206 of the cam rod 202.

In other embodiments, the present disclosure includes methods of forming a trailer hitch assembly 100. In accordance with such methods, two tubular elements 102, 104 may be formed having complementary angled ends. The two tubular elements 102, 104 may be formed with complementary ends by, for example, forming a single rectangular tubular element and cutting the single rectangular tubular element in half. The cut may be started from a first edge of the single rectangular tubular element and finished at a second edge diagonally opposite the first edge. The cut may be at an acute angle relative to a line defined by the first edge of the single rectangular tubular element along the longitudinal length of the single rectangular tubular element. The cut may form the complementary angled end of each tubular element 102, 104. In other embodiments, the cut may be started from a side wall of the single rectangular tubular element and finished at another side wall of the single rectangular tubular element. The cut may be at an acute angle relative to the side wall from which the cut is started. In some embodiments, to form the single rectangular tubular element, a single sheet of metal may be bent into a rectangular shape and a resulting open edge may be sealed with a weld. In other embodiments, a single rectangular tubular element may be formed by welding four separate pieces of metal together. In yet other embodiments, the single rectangular tubular element may formed by extruding or casting the single rectangular tubular element.

In yet other embodiments, the two tubular elements 102, 104 having complementary ends may be formed by, for example, forming the first tubular element 102 from a single rectangular tubular element and forming the first angled end 108 on the first tubular element 102 and forming the second tubular element 104 from a separate single rectangular tubular element and forming the second angled end 128 on the second tubular element 104.

The first angled end 108 on the first tubular element 102 and the second angled end 128 on the second tubular element 104 may be formed by, for example, grinding away portions of the first tubular element 102 and second tubular element 104 until an angled shape is achieved. In other embodiments, the first angled end 108 on the first tubular element 102 and the second angled end 128 on the second tubular element 104 may be formed by cutting each tubular element as described above. The cuts may be started from a first edge of each tubular element 102, 104 and finished at a second edge diagonally opposite the first edge of each tubular element. The cut in each tubular element 102, 104 may be at an acute angle relative to a line defined by the first edge of each tubular element along the longitudinal length of each tubular element 102, 104. In other embodiments, the cuts may be started from one side wall 110 of each tubular element 102, 104 and finished at another side wall 110 of each tubular element. The cut in each tubular element 102, 104 may be at an acute angle relative to the side wall 110 from which the cuts are started relative to the longitudinal length of each tubular element 102, 104. Each tubular element 102, 104 may be cut such that the cut ends of the respective tubular elements 102, 104 form complementary angled ends. Furthermore, the tubular elements 102, 104 may be cut such that the complementary angled ends of the respective tubular elements 102, 104 may be configured to align one with another.

In yet other embodiments, the two tubular elements 102, 104 having complementary ends may be formed by extruding or casting a first tubular element 102 having the first angled end 108 and extruding or casting the second tubular element 104 having the second angled end 128 such that the first angled end 108 and the second angled end 128 may be complementary to each other.

In some embodiments, a hole may be formed in a side wall 110 of each of the two tubular elements 102, 104. The holes may be formed by, for example, drilling, punching, or cutting (e.g., with a torch) a hole in a side wall 110 of each of the two tubular elements 102, 104. In yet another embodiment, the holes may be formed by drilling a hole through both side walls 110 of a single rectangular tubular element before the single rectangular tubular element is cut in half. The holes in a side wall 110 of each of the two tubular elements 102, 104 may be formed such that a hole in one of the two tubular elements 102, 104 aligns with a hole in the other of the two tubular elements 102, 104 when the two tubular elements 102, 104 are aligned such that the security pin 138 may extend simultaneously through both holes. In some embodiments, the holes 136, 156 in the side walls 110 of the two tubular elements 102, 104 may be formed by forming the first hole 136 in a side wall 110 of the first tubular element 102 and forming the second hole 156 in a side wall 110 of the second tubular element 104.

At least one guide projection 140 may be attached to an interior surface 144 of at least one of the two tubular elements 102, 104. For example, the at least one guide projection 140 may be attached (e.g., welded) to the interior surface 144 of the first tubular element 102. In some embodiments, the at least one guide projection 140 may be secured within one of the two tubular elements 102, 104 such that at least a portion of the at least one guide projection 140 extends from an angled end of the tubular element to which the at least one guide projection 140 is attached. For example, the at least one guide projection 140 may be secured within the first tubular element 102 with at least a portion of the at least one guide projection 140 extending from the first angled end 108. In other embodiments, at least one guide projection 140 may be attached to the first tubular element 102 and at least one guide projection 140 may be attached to the second tubular element 104. In yet another embodiment, at least two guide projections 140 may be attached to either the first tubular element 102 or the second tubular element 104.

The at least one guide projection 140 may be attached within at least one of the two tubular elements 102, 104 at an edge of the tubular element 102, 104. In some embodiments, at least one guide projection 140 may be attached at an edge of the tubular element 102, 104 and at least one guide projection 140 may be attached to a diagonally opposite edge of the same tubular element 102, 104. In other embodiments, at least one guide projection 140 may be secured at an edge of the first tubular element 102 and at least one guide projection 140 may be attached to an edge of the second tubular element 104 that is diagonally opposite the edge of the first tubular element 102 when the first tubular element 102 and the second tubular element 104 are aligned. In other embodiments, the at least one guide projection 140 may be attached to a side wall 110 of at least one of the two tubular elements 102, 104. In yet another embodiment, the at least one guide projection 140 may be attached to both an edge and a side wall 110 of at least one of the two tubular elements 102, 104.

In other embodiments of the trailer hitch assembly 100 of the present disclosure, a guide lip 142 may be attached to or formed on an interior surface 144 of at least one of the two tubular elements 102, 104 instead of or in addition to the at least one guide projection 140. The guide lip 142 may be attached or formed along the entire perimeter 146 of the angled end of either the first tubular element 102 or the second tubular element 104. In other embodiments, the guide lip 142 may be attached or formed on only a portion or portions of the entire perimeter 146 of the angled end of one of the two tubular elements 102, 104 and on a complementary portion or portions of the entire perimeter 146 of the angled end of the other of the two tubular elements 102, 104. For example, a guide lip 142 may be attached to the first tubular element 102 and another guide lip 142 may be attached to the second tubular element 104. In yet other embodiments, the guide lip 142 may be attached to only a portion of the entire perimeter 146 of the angled end of only one of the two tubular elements 102, 104. For example, the guide lip 142 may be attached only to a portion of the entire perimeter 146 of the first angled end 108 of the first tubular element 102. The guide lip 142 may be attached to an angled end of at least one of the two tubular elements 102, 104 such that at least a portion of the guide lip 142 extends or protrudes from the angled end of the tubular element 102, 104 in a longitudinal direction and proximate the angled end of the tubular element to which the guide lip 142 is attached.

The second actuator hole 174 may be formed in the secured portion 172 of the second tubular element 104 and the secured portion 172 may be attached or secured to the interior surface 144 of the second tubular element 104. The secured portion 172 may be attached to an edge of the second tubular element 104 and at least one of the upper wall 112 or lower wall 114 and a side wall 110. The secured portion 172 may be attached through, for example, welding, adhesive, and/or mechanical interference. The secured portion 172 may be attached such that the second central axis 171 of the second tubular element 104 extends through a center of the second actuator hole 174. The first actuator hole 162 may be formed in the ball mount 115 such that when the ball mount 115 is attached to the first tubular element 102, the first central axis 170 of the first tubular element 102 extends through a center of the first actuator hole 162. The nut 178 may be secured within in the enlarged portion 176 of the second actuator hole 174 of the second tubular element 104. The nut 178 may have a first threaded center hole 180 formed therein. The nut 178 may be secured through, for example, welding, press fitting, adhering, taping, gluing, and/or providing other mechanical interference.

The ball mount 115 may be attached to the first tubular element 102. The ball mount 115 may be attached through, for example, welding, adhering, and/or providing other mechanical interference. In some embodiments, the ball mount 115 may be formed when the first tubular element 102 is formed. For example, in embodiments where the first tubular element 102 is cast, the ball mount 115 may be cast as part of the first tubular element 102. The elongated bolt 160 may be inserted through the first actuator hole 162 and the threaded end 168 of the elongated bolt 160 may threaded at least partially into the first threaded center hole 180 of the nut 178 secured in the secured portion 172 of the second tubular element 104. In some embodiments, the elongated bolt 160 may be inserted through the first actuator hole 162 prior to a ball being mounted within the ball mount hole 116 in the ball mount 115.

In other embodiments, the second threaded center hole 182 may be formed directly in the secured portion 172. When the secured portion 172 is secured to the second tubular element 104, by the second central axis 171 of the second tubular element 104 may extend through a center of the second threaded center hole 182. The threaded end 168 of the elongated bolt 160 may be threaded into the second threaded center hole 182 of the secured portion 172.

In yet other embodiments, the actuator 158 of the trailer hitch assembly 100 may be formed by forming the quick release cam lever system 184. The quick release cam lever system 184 may be formed by attaching the cam lever 186 to one end of the rod 188 and the adjustment nut 190 to another end of the rod 188. A contact disk 192 may be disposed next to the cam lever 186. The rod 188 may be inserted through the first actuator hole 162 of the ball mount 115 and through the second actuator hole 174 of the secured portion 172. The cam lever 186 may be formed to include a cam lobe portion 194.

In yet other embodiments, the actuator 158 of the trailer hitch assembly 100 may be formed by forming the cam lock system 200. The cam lock system 200 may be formed by securing the secured portion 172 within the second tubular element 104 as described above. The cam rod 202 of the cam lock system 200 may be rotatably secured within the secured portion 172, and may be disposed to extend through the straight hole 204 of the ball mount 115. The cam rod 202 may be formed to include a handle portion 206. The cam lock 208 may be secured to a portion of the ball mount 115 above the straight hole 204. The cam lock 208 may be formed by forming an inclined plane 210 and a notch 212 configured to receive a portion of the handle portion 206 of the cam rod 202. The cam lock 208 may be formed from any geometric shape.

The various components (e.g., first tubular element 102, second tubular element 104, actuator 158, and/or nut 178) of the trailer hitch assembly 110 described above may be provided separately to an end user, or two or more of the components may be pre-assembled prior to reaching the end user.

The example embodiments of the disclosure described above do not limit the scope of the invention, since these embodiments are merely examples of embodiments of the invention, which is defined by the scope of the appended claims and their legal equivalents. Any equivalent embodiments are intended to be within the scope of this invention. Indeed, various modifications of the disclosure, in addition to those shown and described herein, such as alternative useful combinations of the elements described, will become apparent to those skilled in the art from the description. Such modifications and embodiments are also intended to fall within the scope of the appended claims.

What is claimed is:

1. A trailer hitch assembly sized and shaped to fit within a trailer hitch receptacle, the trailer hitch assembly comprising:
    a first tubular hitch member having a rectangular cross section and having a first end and a first angled end opposite the first end, the first angled end having a planar end surface extending from a longitudinally frontmost location at a first edge of the first tubular hitch member to a longitudinally backmost location at a second diagonally opposite edge of the first tubular hitch member, the first edge defining a line along a longitudinal length of the first tubular hitch member, the planar end surface of the first angled end extending along a plane, a reference line being in the plane between the first edge and the second diagonally opposite edge, wherein the line defined by the first edge and the reference line in the plane define an acute angle therebetween;
    a second tubular hitch member having a second end and a second angled end opposite the second end, the second angled end of the second tubular hitch member being complementary to the first angled end of the first tubular hitch member;
    at least one guide projection disposed partially within at least one of the first tubular hitch member and the second tubular hitch member and longitudinally extending from one of the angled ends of the first tubular hitch member or the second tubular hitch member;
    an actuator configured to engage both the first tubular hitch member and the second tubular hitch member and configured to diagonally displace the first tubular hitch member relative to the second tubular hitch member upon actuation, the actuator comprising:
        an elongated bolt extending axially through at least a portion of the first tubular hitch member and at least partially into the second tubular hitch member, the elongated bolt having a head end and a threaded end; and
        a nut mount disposed within the second tubular hitch member and configured to receive the threaded end of the elongated bolt, the nut mount longitudinally positioned closer to the second angled end than to the second end of the second tubular hitch member, the nut mount comprising:
            a secured portion secured to a third edge within the second tubular hitch member and disposed between an end of the third edge on the second angled end of the second tubular hitch member and the second hole relative to a longitudinal length of the trailer hitch assembly, the secured portion having a second actuator hole extending therethrough; and
            a nut secured within an enlarged portion the second actuator hole and configured to receive the threaded end of the elongated bolt;
    a first hole in a side wall of the first tubular hitch member;
    a second hole in a side wall of the second tubular hitch member; and
    a security pin sized and configured to be inserted through the first hole of the first tubular hitch member and the second hole of the second tubular hitch member, and to secure the trailer hitch assembly to the trailer hitch receptacle.

2. The trailer hitch assembly of claim 1, wherein the second hole in the side wall of the second tubular hitch member is larger in diameter than the first hole in the first tubular hitch member.

3. The trailer hitch assembly of claim 1, wherein the actuator further comprises:
   a first actuator hole in the first end of the first tubular hitch member for accommodating the head end of the elongated bolt; and
   a tool configured to engage the head end of the elongated bolt and rotate the elongated bolt.

4. The trailer hitch assembly of claim 1, wherein the actuator comprises a cam lock system comprising:
   a secured portion secured within the second tubular hitch member;
   a cam rod having a slotted end rotatably secured within the secured portion, the cam rod extending through a straight hole extending through a ball mount attached to the first end of the first tubular hitch member;
   a handle portion of the cam rod extending out of the straight hole in the ball mount, the handle portion of the cam rod extending in a direction generally perpendicular to the longitudinal length of the first tubular hitch member; and
   a cam lock secured to the ball mount and having a notch sized and shaped to receive a portion of the handle portion of the cam rod therein when the cam lock is in a locked position.

5. The trailer hitch assembly of claim 1, wherein the at least one guide projection comprises at least two guide projections secured to opposite edges within the first tubular hitch member and at least partially extending from the first angled end of the first tubular hitch member.

6. The trailer hitch assembly of claim 1, wherein the at least one guide projection comprises:
   a first guide projection disposed within the first tubular hitch member and at least partially extending from the first angled end of the first tubular hitch member; and
   a second guide projection disposed within the second tubular hitch member and at least partially extending from the second angled end of the second tubular hitch member.

7. The trailer hitch assembly of claim 1, wherein the first tubular hitch member comprises a ball mount.

8. The trailer hitch assembly of claim 1, wherein a wall thickness of the side wall of the first tubular hitch member and of the second tubular hitch member is at least about 3/16 of an inch.

9. A trailer hitch assembly sized and shaped to fit within a trailer hitch receptacle, the trailer hitch assembly comprising:
   a first tubular hitch member having a rectangular cross section and having a first end and a first angled end opposite the first end, the first angled end having a planar end surface extending from a longitudinally frontmost location at a first edge of the first tubular hitch member to a longitudinally backmost location at a second diagonally opposite edge of the first tubular hitch member, the first edge defining a line along a longitudinal length of the first tubular hitch member, the planar end surface of the first angled end extending along a plane, a reference line being in the plane between the first edge and the second diagonally opposite edge, wherein the line defined by the first edge and the reference line in the plane define an acute angle therebetween;
   a second tubular hitch member having a second end and a second angled end opposite the second end, the second angled end of the second tubular hitch member being complementary to the first angled end of the first tubular hitch member;
   at least one guide projection disposed partially within at least one of the first tubular hitch member and the second tubular hitch member and longitudinally extending from one of the angled ends of the first tubular hitch member or the second tubular hitch member;
   an actuator configured to engage both the first tubular hitch member and the second tubular hitch member and configured to diagonally displace the first tubular hitch member relative to the second tubular hitch member upon actuation, wherein the actuator comprises a cam lock system comprising:
      a secured portion secured within the second tubular hitch member;
      a cam rod having a slotted end rotatably secured within the secured portion, the cam rod extending through a straight hole extending through a ball mount attached to the first end of the first tubular hitch member;
      a handle portion of the cam rod extending out of the straight hole in the ball mount, the handle portion of the cam rod extending in a direction generally perpendicular to the longitudinal length of the first tubular hitch member; and
      a cam lock secured to the ball mount and having a notch sized and shaped to receive a portion of the handle portion of the cam rod therein when the cam lock is in a locked position;
   a first hole in a side wall of the first tubular hitch member;
   a second hole in a side wall of the second tubular hitch member; and
   a security pin sized and configured to be inserted through the first hole of the first tubular hitch member and the second hole of the second tubular hitch member, and to secure the trailer hitch assembly to the trailer hitch receptacle.

10. A trailer hitch assembly sized and shaped to fit within a trailer hitch receptacle, the trailer hitch assembly comprising:
   a first tubular hitch member having a rectangular cross section and having a first end and a first angled end opposite the first end, the first angled end having a planar end surface extending from a longitudinally frontmost location at a first edge of the first tubular hitch member to a longitudinally backmost location at a second diagonally opposite edge of the first tubular hitch member, the first edge defining a line along a longitudinal length of the first tubular hitch member, the planar end surface of the first angled end extending along a plane, a reference line being in the plane between the first edge and the second diagonally opposite edge, wherein the line defined by the first edge and the reference line in the plane define an acute angle therebetween;
   a second tubular hitch member having a second end and a second angled end opposite the second end, the second angled end of the second tubular hitch member being complementary to the first angled end of the first tubular hitch member;

at least two guide projections disposed partially within and secured to opposite edges within the first tubular hitch member and at least partially longitudinally extending from the angled end of the first tubular hitch member;

an actuator configured to engage both the first tubular hitch member and the second tubular hitch member and configured to diagonally displace the first tubular hitch member relative to the second tubular hitch member upon actuation;

a first hole in a side wall of the first tubular hitch member;

a second hole in a side wall of the second tubular hitch member; and a security pin sized and configured to be inserted through the first hole of the first tubular hitch member and the second hole of the second tubular hitch member, and to secure the trailer hitch assembly to the trailer hitch receptacle.

* * * * *